United States Patent Office 3,446,798
Patented May 27, 1969

3,446,798
AZEPINE DERIVATIVES
Werner Küng, Allschwil, Basel-Land, and Daniel A. Prins, Oberwil, Basel-Land, Switzerland, assignors to Geigy Chemical Corporation, Greenburgh, N.Y., a corporation of Delaware
No Drawing. Filed June 21, 1965, Ser. No. 465,734
Claims priority, application Switzerland, June 26, 1964, 8,425/64
Int. Cl. C07d *41/08, 57/00;* A61k *27/00*
U.S. Cl. 260—239                  3 Claims

ABSTRACT OF THE DISCLOSURE

The compounds are of the class of 5-substituted-3-alkylthio or phenylthio iminodibenzyls or iminostilbenes which possess adrenolytic properties with or without CNS effects or exhibit CNS activity without adrenolytic effects. Illustrative species are 5-[2'-(1'methyl-2''-piperidyl)ethyl]-3-ethylthio-10,11-dihydro - 5H-dibenz[b,f]azepine, 5-(3'-dimethylaminopropyl)-3-phenylthio-10,11 - dihydro-5H-dibenz[b,f]azepine, 5-(3'methylaminopropyl)-3 - methylthio-10,11-dihydro-5H-dibenz[b,f]azepine, etc.

---

This invention relates to new azepine derivatives.
The new compounds of the present invention are represented by the formula

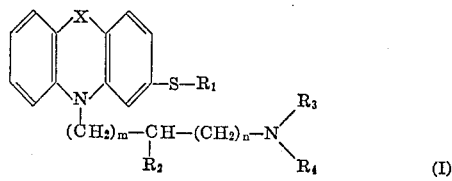

wherein X represents the —CH$_2$—CH$_2$— or the —CH=CH— bridge member, R$_1$ represents a lower alkyl or the phenyl radical, R$_2$ represents hydrogen or a lower alkyl group, R$_3$ represents hydrogen, a lower alkyl or the benzyl radical, R$_4$ represents a lower alkyl group or, when taken together with R$_2$, it represents an alkylene radical with (3—n) or (4—n) chain members or, when taken together with R$_3$, it represents an alkylene radical having 4–6 chain members, m represents 1 or 2, n represents 0, 1 or 2, but the sum of m and n does not exceed 3, as well as their nontoxic addition salts with inorganic and organic acids, have interesting pharmacological properties.

Compounds of Formula I wherein R$_3$ is hydrogen or the benzyl radical can be used as intermediate products for the production of other pharmaceuticals.

More particularly, a first class of compounds according to the invention, which fall under the formulas

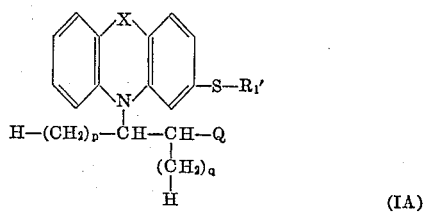

and

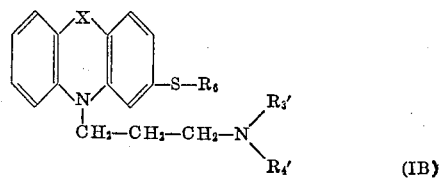

and wherein each of p and q represent 0 or 1, but the sum of p and q does not exceed 1, R$_1$' represents alkyl of from 1 to 3 carbon atoms, Q represents the groupings

or

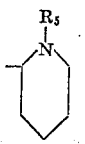

each of R$_3$', R$_4$' and R$_5$ represents alkyl of from 1 to 2 carbon atoms, R$_4$' being preferably methyl, R$_6$ represents ethyl or phenyl, and X represents —CH$_2$—CH$_2$— or —CH=CH—, possess strong adrenolytic activity free from activity on the central nervous system (CNS), and are useful as vasodilating agents.

This is particularly surprising since compounds falling under Formula I in which R$_3$ and R$_4$ together represent a polymethyleneimino ring, i.e., wherein

represents, e.g., the pyrrolidino or piperidino group or piperazino group, are known to be devoid of adrenolytic activity. Moreover, similarly constituted iminodibenzyls which are substituted in 3-position by alkyl-sulfonyl rather than alkylthio groups, e.g., 3-ethylsulfonyl-5-(3'-dimethylamino-propyl)-iminodibenzyl, and distinguished by the fact that they are antihistaminic agents, but not useful as vasodilating agents because they lack useful adrenolytic activity.

Another class of compounds according to the invention, which fall under the formula

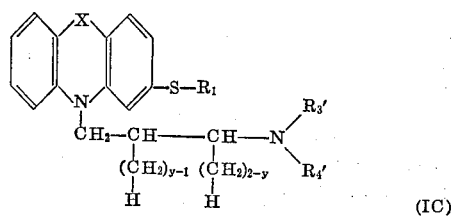

wherein X, R$_1$', R$_3$' and R$_4$' have the same meaning as in Formulas IA and IB, and y represents 1 or 2, are characterized by a combined CNS-tranquilizing effect and pronounced adrenolytic activity, which render them particularly useful as tranquilizing agents in states of excitation characterized by elevated sympathetic tone, in which cases treatment with tranquilizing agents lacking adrenolytic activity would only be insufficiently effective.

It is particularly surprising that these compounds have adrenolytic activity since the known 3-methylthio-5-[3'-(2''-methyl-1'-piperazinyl)-propyl]-iminodibenzyl is devoid of such activity; moreover, it is contrary to expectation that the instant replacement of the piperazino moiety by an N-alkyl-substituted amino group affords compounds of tranquilizing activity; indeed, CNS-stimulating activity would have been expected in view of such well-known examples as 5-(3'-dimethylamino-propyl)-iminodibenzyl and -iminostilbene on the one hand, and 5-(3'-β-hydroxyethylpiperazino-propyl)-iminodibenzyl and -iminostilbene on the other hand [compare, e.g., Theobald et al. "Arch. Intern. Pharmacodynamie et de Thérapie," 148 p. 560 et seq. (1964)].

Structurally similar iminodibenzyls which bear an alkylsulfonyl group in 3-position in lieu of the alkylthio group of the compounds of Formula IC, such as 3-ethylsulfonyl-5-(3'-dimethylamino-2'-methyl- or -3'-methylpropyl)-iminodibenzyl, are devoid of CNS-tranquilizing activity.

A third class of compounds according to the invention, which fall under the formula

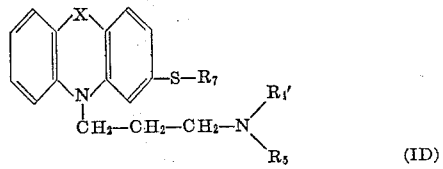

wherein X, $R_4'$ and $R_5$ have the same meaning as in Formula IA, and $R_7$ represents methyl or isopropyl, possess combined pronounced adrenolytic and CNS-stimulating activities which render them useful as geriatric antidepressive agents, in the treatment of senile mental depressions.

This is particularly surprising since the next adjacent homologs falling under Formula IB, e.g., 3-ethylthio-5-(3'-dimethylamino-propyl)-iminodibenzyl lacks usefulness as an antidepressive agent.

Moreover, known 3-alkyl-sulfonyl-5-(3'-dialkylamino-popyl)-iminodibenzyls are antihistaminic agents, but lack useful adrenolytic or CNS-stimulating properties.

A fourth class of compounds according to the invention, which fall under the formula

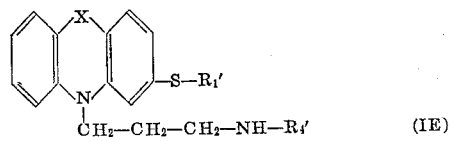

wherein X and $R_1'$ and $R_4'$ have the same meaning as in Formula IA, possess strong CNS-stimulating activity substantially free from adrenolytic effect and autonomic and somatic side-effects, and are therefore suitable as antidepressive agents in the treatment of endogenous mental depressions, and psychasthenia (of Janot).

The new active substances according to the invention can be administered perorally, rectally and parenterally. The daily dosages of the free bases or of pharmaceutically acceptable, nontoxic addition salts thereof vary between 5 and 300 mg. for adult patients. Suitable dosage units such as dragées (sugar coated tablets), tablets, suppositories or ampoules preferably contain 5–50 mg. of an active substance according to the invention or of a nontoxic salt thereof.

By nontoxic addition salts of the bases usable according to the invention are meant salts with those acids the anions of which are pharmaceutically acceptable in the usual dosages, i.e., which do not have any toxic effects when administered in such dosages. It is also of advantage if the salts to be used crystallize well and are not or only slightly hygroscopic. Examples of such non-toxic addition salts are those formed with hydrochloric acid, hydrobromic acid, sulfuric acid, phosphoric acid, methane sulfonic acid, 1,2-ethane disulfonic acid, β-hydroxyethane sulfonic acid, acetic acid, lactic acid, oxalic acid, succinic acid, fumaric acid, maleic acid, malic acid, tartaric acid, citric acid, benzoic acid, salicylic acid, phenyl acetic acid and mandelic acid. Such nontoxic salts can be used as active ingredients instead of the free bases.

Dosage units for peroral administration preferably contain between 1% and 90% of an active compound according to the invention or of a nontoxic addition salt thereof as active substance.

They are produced by combining the active substance, e.g., with solid, pulverulent carriers such as lactose, saccharose, sorbitol, mannitol; starches such as potato starch, maize starch or amylopectin, also laminaria powder or citrus pulp powder; cellulose derivatives or gelatines, optionally with the addition of lubricants such as magnesium or calcium stearate or polyethylene glycols (carbowaxes) of suitable molecular weights, to form tablets or dragée cores. The latter are coated, for example with concentrated sugar solutions which can also contain, e.g., gum arabic, talcum and/or titanium dioxide, or with a lacquer dissolved in easily volatile organic solvents or mixtures of solvents. Dyestuffs can be added to these coatings e.g., to distinguish between varying dosages of active substance.

Dosage units for rectal administration are, e.g., suppositories which consist of a combination of an active substance or a suitable salt thereof with a neutral fatty foundation, or also gelatine rectal capsules which contain a combination of the active substance or of a suitable salt thereof with polyethylene glycols (carbowaxes) of suitable molecular weight.

Ampoules for parenteral, particularly intramuscular, administration preferably contain a water soluble salt of an active substance in a concentration of preferably 0.5–5%, optionally together with suitable stabilizing agents and buffffer substances, in aqueous solution.

The production of tablets and dragées is illustrated by the following:

(a) 250 g. of 5-(3'methylamino-propyl)-3-isopropyl-thio-10,11-dihydro - 5H-dibenz[b,f]azepine fumarate are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 250 g. of magnesium stearate and 32 g. of colloidal silicium dioxide are mixed in and the mixture is pressed into 10,000 tablets each weighing 100 mg. and containing 25 mg. of active substance (fumarate). If desired the tablets can be grooved for better adaptation of the dosage.

(b) A granulate is produced from 250 g. of 5-(3'-methyl-amino-propyl) - 3 - methylthio-10,11-dihydro-5H-dibenz[b,f]azepine hydrochloride, 175.90 g. of lactose and the alcoholic solution of 10 g. of stearic acid. After drying, 56.60 g. of colloidal silicium dioxide, 165 g. of talcum, 20 g. of potato starch and 2.50 g. of magnesium stearate are mixed in and the mixture is pressed into 10,000 dragée cores. These are then coated with a concentrated syrup made from 502.28 g. of crystallized saccharose, 6 g. of shellac, 10 g. of gum arabic, 0.22 g. of dyestuff and 1.5 g. of titanium dioxide and dried. The dragées obtained each weigh 120 mg. and contain 25 mg. of active substance.

The new compounds of Formula I are produced by reacting compounds of the formula

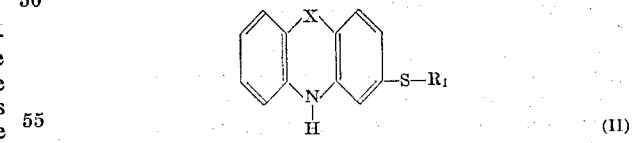

wherein X and $R_1$ have the meaning given above, with a reactive ester of an amino alcohol of the formula

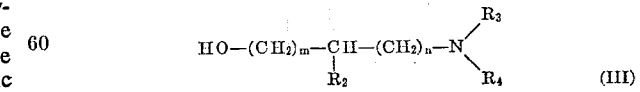

wherein $R_2$, $R_3$, $R_4$, $m$ and $n$ have the meanings given in Formula I, the reaction being performed in the presence of a basic condensing agent, and, if desired, converting the compound obtained of Formula I into a salt with an inorganic or organic acid. Suitable condensing agents are, in particular, sodium amide, lithium amide, potassium amide, sodium, potassium, lithium, butyl lithium, phenyl lithium, sodium-tert. butylate, sodium hydride or lithium hydride. The reaction, which is performed at a temperature of about 75 to 150° C., can be performed in the presence or absence of an inert organic solvent such as benzene, toluene, xylene, cumene, tetralin or dimethyl formamide.

Starting materials of Formula II wherein $R_1$ is alkyl are obtained, e.g., by diazotizing a 3-amino-5-acyl-5H-dibenz[b,f]azepine and converting the diazonium salt obtained into a 3-chlorosulfonyl - 5 - acyl-5H-dibenz[b,f] azepine with the aid of copper-(II) chloride and sulfur dioxide. The chlorosulfonyl compound is then reduced with hydroiodic acid to a bis-(5-acyl-5H-dibenz[b,f] azepin-3-yl)disulfide. The disulfide obtained is further reduced with glucose to a 5-acyl-5H-dibenz[b,f]azepine-3-thiol, the latter is alkylated in the same step with an alkyl halide to a 3-alkylthio-5-acyl-5H-dibenz[b,f]azepine and this is hydrolyzed with potassium hydroxide. In an analogous manner 10,11-dihydro derivatives may be obtained by using 3-amino-5-acyl-10,11-dihydro-5H-dibenz[b,f]azepine as starting material.

According to a further process 3-alkylthio-5H-dibenz[b,f]azepines of Formula II are obtained by converting 3 - alkylthio-5-acyl - 10,11 - dihydro-5H-dibenz[b,f]azepines with N-bromosuccinimide into the 3-alkylthio-5-acyl-10-(or 11-)bromo-10,11-dihydro-5H-dibenz[b,f]azepines and treating these with potassium hydroxide.

A starting material of Formula II wherein $R_1$ is phenyl is obtained, e.g., by diazotizing a 3-amino-5-acyl-10,11-dihydro-5H-dibenz[b,f]azepine, coupling this with thiophenol in alkaline solution, converting the diazo sulfide formed as intermediate product by heating it in the same step into a 5-acyl-3-phenylthio-10,11-dihydro-5H-dibenz[b,f]azepine and hydrolyzing the latter with potassium hydroxide.

In an analogous manner the 3-phenylthio-5H-dibenz[b,f]azepine compound of Formula II is obtained by using 3-amino-5-acyl-5H-dibenz[b,f]azepine as starting material. This 3-phenylthio compound may be obtained by a second process, for example, by producing analogously to the 3-alkylthio-5-acyl-5H-dibenz[b,f]azepines mentioned above, a 3-(p-nitrophenylthio)-5-acyl-5H-dibenz[b,f]azepine as intermediate product, reducing this nitro compound with iron filings to a 3-(p-aminophenylthio)-5-acyl-5H-dibenz[b,f]azepine, diazotising this amino compound and reducing the diazonium salt obtained with hypophosphorous acid to a 3-penylthio-5-acyl-5H-dibenz[b,f]azepine which is hydrolyzed as above. In an analogus manner the corresponding 10,11-dihydro derivative can be prepared by starting from 3-(p-nitrophenylthio)-5-acyl-10,11-dihydro-5H-dibenz[b,f]azepine.

Examples of starting materials of Formula II are 3-methylthio-, 3-ethylthio-, 3-propylthio-, 3-isopropylthio- and 3-phenylthio-5H-dibenz[b,f]azepine and their corresponding 10,11-dihydro derivatives.

As reactive esters of amino alcohols of Formula III the halides in particular are used. Individually can be named:

2-dimethylaminoethyl chloride,
2-diethylaminoethyl chloride,
2-methylethylaminoethyl chloride,
2-dimethylamino-propyl chloride,
3-dimethylaminopropyl chloride,
3-dimethylaminobutyl chloride,
4-dimethylaminobutyl chloride,
3-dimethylamino-2-methylpropyl chloride,
2-dipropylaminoethyl chloride,
2-methylisopropylamino-ethyl chloride,
1-(2'-chloroethyl)-pyrrolidine,
1-(3'-chloropropyl)-pyrrolidine,
1-(2'-chloroethyl)-piperidine,
1-(3'-chloropropyl)-piperidine,
2-(2'-chloroethyl)-1-methyl-pyrrolidine,
2-(2'-chloroethyl-1-methyl-piperidine,
3-chloromethyl-1-methyl-piperidine,
1-(3'-chloropropyl)-hexahydroazepine and
1-(3'-chloro-2'-methyl-propyl)-hexahydroazepin as well as the corresponding bromides, iodides and p-toluene sulfonates.

Compounds of Formula I are produced by a second process by reacting a reactive ester of an alcohol of the formula

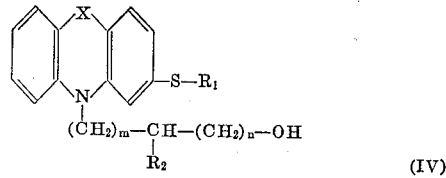

wherein X, $R_1$, $R_2$, $m$ and $n$ have the meanings given in Formula I, with an amine of Formula V

wherein $R_3$ and $R_4$ have the meanings given in Formula I and, if desired, converting the compound obtained of Formula I into a salt with an inorganic or organic acid. In this process, $R_4$ and $R_2$ can not be bound together. The reaction can be performed, for example, at a moderately raised temperature from 60–120° C. It is particularly advantageous to use a low alkanol such as methanol or ethanol as solvent and to perform the reaction in the presence of excess amine as acid binding agent. If the amine (V) is volatile at the given reaction temperature, the reaction is advantageously performed in an autoclave.

The reactive esters of compounds of Formula IV such as halides, methane sulfonates and aryl sulfonates are obtained by converting, for example, 3-phenylthio- or 3-alkylthio-5H-dibenz[b,f]azepines or their corresponding 10,11-dihydro derivatives, all of which are embraced by Formula II, into alkali metal derivatives. These are reacted with one mol equivalent of low 1,2-epoxy alkanes and the hydroxyalkyl derivatives obtained are reacted with inorganic acid halides, methane sulfonic acid chloride or aryl sulfonic acid chlorides. The 5-halogen-alkyl-5H-dibenz[b,f]azepines and their 10,11-dihydro derivatives can also be obtained in one step by condensing alkali metal compounds of 3-phenylthio- or of 3-alkylthio-5H-dibenz[b,f]azepines or 10,11-dihydro compounds thereof with non-geminal dihalogenoalkanes—particularly those having two different halogen atoms are used—or with haloalkylaryl sulfonates. Examples of such starting materials are the 3-methylthio, 3-ethylthio, 3-isopropylthio, 3-phenylthio derivatives of 5-(3'-chloropropyl)- and of 5-(3'-chloro-2'-methylpropyl)-5H-dibenz[b,f]azepine or 10,11-dihydro-derivatives as well as the corresponding bromo compounds, methane sulfonates and p-toluene sulfonates. They can be reacted, for example, with dimethylamine, methylethylamine, diethylamine, methylamine, ethylamine, n-propylamine, pyrrolidine, piperidine or hexahydroazepine.

Compounds of Formula I are produced by a third process by reducing the carbonyl group to the methylene group in a compound of the formula

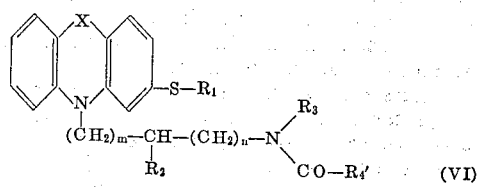

wherein X, $R_1$, $R_2$, $R_3$, $m$ and $n$ have the meanings given in Formula I and $R_4'$ represents hydrogen or a lower alkyl radical which contains one methylene group less than $R_4$; by means of a complex metal hydride, particularly lithium aluminium hydride, in an organic solvent, in particular in an ether-like liquid such as diethyl ether, tetrahydrofuran or dioxan, and, if desired, converting the compound obtained of Formula I into a salt with an inorganic or organic acid.

The starting materials of Formula VI are described after the fifth process below.

Compounds of Formula I are produced by a fourth process by heating a compound of the formula

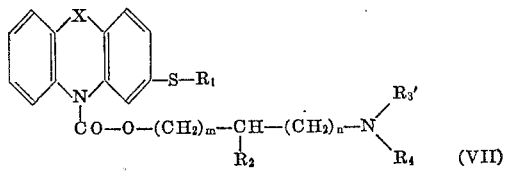

(VII)

wherein X, $R_1$, $R_2$, $R_4$, $m$ and $n$ have the meanings given in Formula I and $R_3'$ represents a lower alkyl or benzyl group; until the equimolar amount of carbon dioxide is split off and, if desired, converting the compound obtained of Formula I into a salt with an inorganic or organic acid.

The starting materials of Formula VII are obtained by reacting one or more molar equivalents of phosgene with the 3-alkylthio- or 3-phenylthio-5H-dibenz[b,f]azepines or corresponding 10,11-dihydro compounds embraced by Formula II and reacting the 3-alkylthio- or 3-phenylthio-5-chlorocarbonyl-5H-dibenz[b,f]azepines or corresponding 10,11-dihydro derivatives formed with a dialkylamino alkanol of the formula

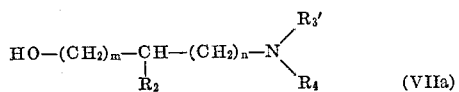

(VIIa)

wherein $R_2$, $R_4$, $m$ and $n$ have the meanings given in Formula I and $R_3'$ represents a lower alkyl or benzyl group, an excess of the amino alcohol reacted advantageously being used as acid binding agent.

Examples of starting materials of Formula VII are the 3-methylthio-, 3-ethylthio-, 3-isopropylthio- and 3-phenylthio-5H-dibenz[b,f]azepine-5-carboxylic acid-(3'dimethylaminopropyl esters) as well as the 3-methylthio-, 3-ethylthio-, 3-isopropylthio- and 3-phenylthio-5H-dibenz[b,f]azepine-5-carboxylic acid-[2'-(1''methyl-2''-piperidyl)-ethyl esters] and the analogous 10,11-dihydrocompounds.

Compounds of Formula I are produced by a fifth process by hydrolyzing or thermolyzing a compound of the formula

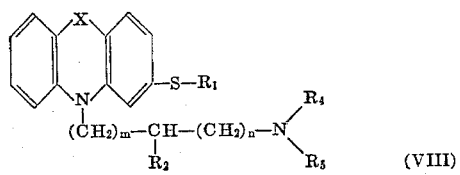

(VIII)

wherein X, $R_1$, $R_2$, $R_4$, $m$ and $n$ have the meanings given in Formula I and $R_5$ represents the acyl radical of a carboxylic acid or the acyl radical of a monofunctional derivative of carbonic acid and, if desired, converting the compound obtained of Formula I, wherein $R_3$ is hydrogen, into a salt with an inorganic or organic acid.

Compounds in which the carboxylic acid radical $R_5$ is an alkanoyl radical are embraced by Formula VI. Other examples for $R_5$ are the chlorocarbonyl, an alkoxycarbonyl, the phenoxycarbonyl or the benzoyl radical. The alkanoyl, chlorocarbonyl and alkoxycarbonyl and phenoxycarbonyl radicals can be split off, for example by acid or alkaline hydrolysis. Acid hydrolysis is preferably performed with an inorganic acid such as hydrochloric acid or sulfuric acid. Alkaline hydrolysis is performed by means of an alkali hydroxide such as potassium hydroxide at a raised temperature in a hydroxyl-containing solvent. Such solvents are, e.g., lower alkanols such as methanol, ethanol, also ethylene glycol, diethylene glycol or diethylene glycol monoethyl ether.

The starting materials of Formula VIII are obtained, for example, by starting from a 3-alkylthio- or 3-phenylthio- 5H-dibenz[b,f]azepine or the corresponding 10,11-dihydro derivatives of Formula II, converting this into the sodium derivative and reacting the latter with a reactive ester of the formula

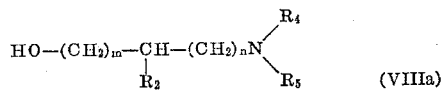

(VIIIa)

wherein $R_2$, $R_4$, $R_5$, $m$ and $n$ have the meanings given under Formula I or Formula VIII.

A second possibility for the production of starting materials of Formula VIII consists in reacting reactive esters of hydroxyl compounds of Formula IV, e.g., halides, with an amide of the formula

(VIIIb)

wherein $R_4$ and $R_5$ have the meanings given in Formula I and VIII respectively, the reaction being performed in the presence of an acid binding agent or with metal compounds of such an amide.

Starting materials of Formula VIII are obtained by a third method by, e.g., starting from a 3-alkylthio- or 3-phenylthio-5H-dibenz[b,f]azepine. From this, the sodium derivative is produced which is alkylated, for example, with a non-geminal bromoalkyl chloride to form a 3-alkylthio- or 3-phenylthio-5-chloroalkyl-5H-dibenz[b,f] azepine. The chloroalkyl compound obtained is then reacted with an alkali cyanide such as potassium cyanide, to form a 3-alkylthio- or 3-phenylthio-5H-dibenz[b,f]azepine-5-alkane nitrile. The nitriles obtained in this way as intermediate products contain a chain of at least two carbon atoms between the ring nitrogen atom and the nitrile group. Corresponding compounds in which the ring nitrogen atom and the nitrile group are bound to the same carbon atom are produced, e.g., by reacting a 3-alkylthio- or 3-phenylthio-5H-dibenz[b,f]azepine with formaldehyde and an alkali cyanide in the presence of an acid. Both groups of nitrile compounds are then catalytically reduced, e.g., with hydrogen in the presence of Raney nickel, to the 5-aminoalkyl compounds which, with a reactive functional derivative of a carboxylic acid such as an ester, halide or anhydride, yield 5-acylaminoalkyl derivatives. The sodium derivatives of these compounds are alkylated with lower alkylating agents such as dimethyl sulfate or ethyl iodide, to form the 5-(N-acyl-N-alkyl-aminoalkyl)-3-alkylthio-5H-dibenz[b,f]azepines or the corresponding 3-phenylthio compounds. In an analogous manner the 10,11-dihydro derivatives of Formula VIII are obtained by using 3-alkylthio- or 3-phenylthio-10,11-dihydro-5H-dibenz[b,f]azepine as starting material.

Starting materials of Formula VIII can also be produced by a fourth process by reacting compounds which are already embraced by Formula I and in which $R_3$ is a lower alkyl or the benzyl group and $R_4$ is a lower alkyl group— they can be produced, for example, by the first or second process—with one molar equivalent of an organic acid halide or anhydride, in particular with a carbonic acid ester chloride (chloroformic acid ester), acetic anhydride, acetyl bromide, benzoyl chloride or phosgene.

Of the starting materials of Formula VIII, the following can be mentioned: the 3-methylthio-, 3-ethylthio-, 3-isopropylthio- and 3-phenylthio- derivatives of N-[3-5'H-dibenz[b,f]azepin-5'-yl)-propyl]-N-methyl - carbamic acid ethyl ester and of N-[3-(5'H-dibenz[b,f]azepin-5'-yl)-propyl]-N-methyl acetamide, -N-ethyl-acetamide, -N-propylacetamide and -N-butyl-acetamide as well as the corresponding 10,11-dihydro derivatives.

The following nonlimitative examples further illustrate the production of the new compounds of Formula I and of novel intermediates. The temperatures are given in degrees centigrade. Percentages are given by weight unless expressly stated otherwise, "abs." means absolute.

EXAMPLE 1

(a) 40 g. of 5-acetyl-3-chlorosulfonyl-10,11-dihydro-5H-dibenz[b,f]azepine are dissolved in 520 ml. of glacial acetic acid and 180 ml. of 57% hydroiodic acid are added in small portions. The reaction mixture is left to stand for 70 hours at 20° resulting in partial solidification. It is then poured into 2.5 liters of a 5% sodium thiosulfate solution and the precipitate is filtered off under suction. The brown filter residue is dissolved in 1.5 liters of chloroform and the color removed by washing with 300 ml. of 10% sodium thiosulfate solution. The chloroform phase is washed with water and dried over sodium sulfate. After removing the solvent in vacuo, there is obtained bis-(5-acetyl-10,11-dihydro-5H-dibenz[b,f]azepin-3-yl)-disulfide.

For further purification the product is dissolved in ethyl acetate and the solution is filtered through a column of alumina (Woelm activity I, neutral). After concentrating the filtrate in vacuo, the pure disulfide is obtained as an amorphous powder which decomposes at 110°.

(b) 12 g. of sodium hydroxide in 250 ml. of methanol are added dropwise to 32 g. of the non-purified disulfide and 23 g. of glucose in 700 ml. of ethanol, the addition being made while stirring and bubbling nitrogen through. The reaction mixture is stirred for an hour at 60° and then cooled to 20°. Then 40 g. of methyl iodide in 150 ml. of ethanol are added dropwise within 30 minutes, whereafter the reaction mixture is stirred, first for 2 hours at 20° and then for 2 hours at 60°. It is then evaporated under reduced pressure and the residue is taken up in chloroform and water. The chloroform phase is washed neutral with water and dried over sodium sulfate. On evaporating off the chloroform in vacuo, there is obtained 3-methylthio-5-acetyl-10,11-dihydro - 5H - dibenz[b,f]azepine which is purified by distillation under high vacuum, B.P. 160°/0.003 torr.

(c) 99 g. of the above acetyl compound are refluxed for 8 hours with 95 g. of potassium hydroxide and 500 ml. of diethylene glycol monoethyl ether. The reaction mixture is poured into 5 liters of water and extracted with diethyl ether. The ether extract is washed well with water, dried over sodium sulfate and concentrated in vacuo. The residue consists of the 3-methylthio-10,11-dihydro-5H-dibenz[b,f]azepine and is crystallized from diethyl ether/petroleum ether, M.P. 64°.

EXAMPLE 2

30 g. of the thioether obtained according to Example 1(c) and 750 ml. of abs. toluene are placed in a stirring flask which is kept at 70° under an atmosphere of nitrogen. A suspension of 5.6 g. of sodium amide in 30 ml. of abs. toluene is added to this solution and the mixture is refluxed for 90 minutes. 19.3 g. of 3-dimethylamino-propyl chloride in 250 ml. of abs. toluene are added dropwise within 5 minutes and the reaction mixture is refluxed for another 17 hours. It is then cooled to 20° and washed with water. The basic parts are removed by extraction with 2 N hydrochloric acid from the toluene phase. The hydrochloric acid extract is then made alkaline with concentrated sodium hydroxide solution and the free bases are extracted with diethyl ether. The ether solution is washed with water, dried over sodium sulfate and concentrated in vacuo. The residue is dissolved in acetone and ethereal hydrochloric acid is then added to the solution. There is obtained 5-(3'-dimethylamino-propyl)-3-methylthio-10,11-dihydro-5H-dibenz[b,f]azepine hydrochloride which crystallizes from acetone/diethyl ether, M.P. 170°.

EXAMPLES 3 TO 5

The following compounds are obtained analogously to Example 2 from 2-methylthio-10,11-dihydro-5H-dibenz[b,f]azepine:

Example 3. — With 3-dimethylamino-2-methyl-propyl chloride, 5-(3'-dimethylamino-2'-methyl-propyl)-3-methylthio-10,11-dihydro-5H-dibenz[b,f]azepine; converted with oxalic acid in diethyl ether into the oxalate, M.P. 148° (from ethanol).

Example 4. — With 2-(1'-methyl-2'-piperidyl)-ethyl chloride, 5-[2'-(1''-methyl-2''-piperidyl)-ethyl]-3-methylthio-10,11-dihydro-5H-dibenz[b,f]azepine, hydrochloride, M.P. 183° (from ethanol/diethyl ether), and Example 5.—With 3-(methylethylamino)-propyl chloride, 5-[3'-(methyl-ethylamino)-propyl]-3-methylthio-10,11-dihydro-5H-dibenz[b,f]azepine; oxalate M.P. 135° (from ethanol/diethyl ether).

EXAMPLE 6

Repeating Example 1 but using in step (b) an equivalent amount of ethyl iodide in lieu of methyl iodide there is first obtained 3-ethylthio-5-acetyl-10,11-dihydro-5H-dibenz[b,f]azepine, M.P. 102° from diethyl ether, and therefrom by saponification in accordance with step (c) of Example 1, 3-ethylthio-10,11-dihydro-5H-dibenz[b,f]azepine, B.P. 150°/0.001 torr.

EXAMPLES 7 TO 11

The following compounds are obtained analogously to Example 2 from 3-ethylthio-10,11-dihydro-5H-dibenz[b,f]azepine:

Example 7.—With 3-dimethylamino-propyl chloride, 5 - (3' - dimethylamino - propyl) - 3 - ethylthio - 10,11-dihydro-5H-dibenz[b,f]azepine, B.P. 180°/0.001 torr; converted with oxalic acid in diethyl ether into the oxalate, M.P. 180° from ethanol.

Example 8.—With 2-dimethylamino-propyl chloride, 5 - (2' - dimethylamino - propyl) - 3 - ethylthio - 10,11-dihydro-5H-dibenz[b,f]azepine, B.P. 180°/0.001 torr.

Example 9. — With 3-dimethylamino-2-methyl-propyl chloride, 5 - (3' - dimethylamino - 2' - methyl - propyl)-3-ethylthio-10,11-dihydro-5H-dibenz[b,f]azepine; converted with oxalic acid in diethyl ether into the oxalate, M.P. 155° from ethanol; hydrochloride M.P. 164° (from chloroform/acetone).

Example 10.—With 3-dimethylamino-butyl chloride, 5 - (3' - dimethylaminobutyl) - 3 - ethylthio - 10,11-dihydro-5H-dibenz[b,f]azepine, B.P. 160° at 0.001 torr, and Example 11.—With 1-methyl-2-(2'-chloroethyl)-piperidine, 5 - [2' - (1'' - methyl - 2'' - piperidyl) - ethyl] - 3-ethylthio-10,11-dihydro-5H-dibenz[b,f]azepine, B.P. 200° at 0.001 torr.

EXAMPLE 12

Repeating steps (b) and (c) of Example 1, but using an equivalent amount of isopropylbromide in lieu of methyl iodide, there are obtained first 3-isopropylthio-5-acetyl - 10,11 - dihydro - 5H - dibenz[b,f]azepine, M.P. 89° (from diethyl ether) and therefrom 3-isopropylthio-11,11-dihydro-5H-dibenz[b,f]azepine, M.P. 79° (from diethyl ether/petroleum ether).

EXAMPLES 13 TO 18

The following compounds are produced analogously to Example 2 from 3-isopropylthio-10,11-dihydro-5H-dibenz[b,f]azepine:

Example 13.—With 2-dimethylamino-ethyl chloride, 5 - (2' - dimethylaminoethyl) - 3 - isopropylthio - 10,11-dihydro-5H-dibenz[b,f]azepine, hydrochloride, M.P. 182° (from acetone/diethyl ether).

Example 14.—With 2-diethylamino-ethyl chloride, 5-(2' - diethylamino - ethyl) - 3 - isopropylthio - 10,11 - dihydro-5H-dibenz[b,f]azepine, hydrochloride M.P. 147° (from acetone/diethyl ether).

Example 15.—With 3-dimethylamino-propyl chloride, 5 - (3' - dimethylamino - propyl) - 3 - isopropylthio - 10, 11-dihydro-5H-dibenz[b,f]azepine; it is converted with oxalic acid in diethyl ether into the oxalate M.P. 169° (from ethanol); with hydrogen chloride in diethyl ether the hydrochloride is obtained and with fumaric acid, the fumarate.

Example 16.—With 3-dimethylamino-2-methyl-propyl chloride, 5 - (3' - dimethylamino - 2' - methyl - propyl)-3-isopropylthio-10,11-dihydro-5H-dibenz[b,f]azepine, hydrochloride M.P. 156° (from acetone/diethyl ether).

Example 17.—With 1-(2'-chloroethyl)-pyrrolidine, 5-(2' - pyrrolidino - ethyl) - 3 - isopropylthio - 10,11 - dihydro-5H-dibenz[b,f]azepine, hydrochloride M.P. 170° (from acetone/diethyl ether), and Example 18. — With 3-(benzyl-methylamino)-propyl chloride, 5 - (3' - benzyl - methylamino - propyl) - 3 - isopropylthio-10,11-dihydro-5H-dibenz[b,f]azepine, oxalate M.P. 157° (from ethanol).

EXAMPLE 19

(a) 15 g. of 5-(3'-dimethylamino-propyl)-3-methylthio-10,11-dihydro-5H-dibenz[b,f]azepine in 450 ml. of anhydrous benzene are placed in a stirring flask at 65°. 5.5 g. of ethyl chloroformate in 80 ml. of anhydrous benzene are then added dropwise within 20 minutes and the reaction mixture is refluxed for 5 hours. To remove the unchanged starting material, the benzene solution is extracted with 2 N hydrochloric acid, then washed with water and the solvent removed in vacuo.

(b) The oily residue consisting of ethyl N-[3-(3'-methylthio - 10',11' - dihydro - 5' - dibenz[b,f]azepin - 5'-yl)-propyl]-N-methyl-carbamate is refluxed for 6 hours with 7.5 g. of potatssium hydroxide in 100 ml. of diethylene glycol monoethyl ether and then one liter of water is added. The reaction product precipitates. The basic parts are removed from the ether extract with 2 N hydrochloric acid. The hydrochloric acid phase is made alkaline with concentrated sodium hydroxide solution and the free bases are taken up in diethyl ether. The ether phase is washed with water, dried over sodium sulfate and concentrated in vacuo. The residual 5-(3'-methylaminopropyl)-3-methylthio-10,11-dihydro-5H-dibenz[b,f]azepine is dissolved in diethyl ether and converted with ethereal hydrochloric to the hydrochloride which crystallizes from acetone/diethyl ether, and melts at 139°.

EXAMPLE 20

By following the procedure of Example 19, ethyl N-[3-(3' - ethylthio - 10',11' - dihydro - 5'H - dibenz[b,f]azepin-5'-yl)-propyl]-N-methyl-carbamate is obtained from 5 -(3' - dimethylamino - propyl) - 3 - ethylthio - 10,11-dihydro-5H-dibenz[b,f]azepine with ethyl chloroformate. This product is reacted with potassium hydroxide in diethylene glycol monoethyl ether to form 5-(3'-methylamino-propyl) - 3 - ethylthio - 10,11 - dihydro - 5H - dibenz[b,f]azepine which is then converted with oxalic acid in diethyl ether into the oxalate; M.P. 210° (from ethanol).

EXAMPLE 21

5 - (3'-methylamino-2'-methylpropyl) - 3 - ethylthio-10,11-dihydro-5H-dibenz[b,f]azepine is produced analogously to Example 19 from 5-(3'-dimethylamino-2'-methylamino) - 3 - ethylthio - 10,11 - dihydro - 5H - dibenz[b,f]azepine, hydrochloride M.P. 150° (from acetone/ether).

EXAMPLE 22

By following the procedure of Example 19, ethyl N-[3-(3' - isopropylthio - 10',11' - dihydro - 5'H - dibenz[b,f]azepin-5'-yl)-propyl]-N-methyl carbamate is produced from 5-(3'-dimethylamino-propyl)-3-isopropylthio-10,11-dihydro-5H-dibenz[b,f]azepin with ethyl chloroformate. This product is reacted with potassium hydroxide in diethylene glycol monoethyl ether to form 5-(3'-methylamino-propyl) - 3 - isopropylthio - 10,11 - dihydro - 5H - dibenz[b,f]azepine which is converted with oxalic acid in diethyl ether into the oxalate, M.P. 185° (decomposition) from ethanol. The hydrochloride is obtained from the base and hydrogen chloride in ether; with fumaric acid there is obtained the acid fumarate, M.P. 129–131°.

EXAMPLE 23

(a) Working in accordance with step (b) of Example 1, 10 g. of the disulfide obtained according to Example 1(a) are reduced with 6 g. of glucose and 3.4 g. of sodium hydroxide in 75 ml. of methanol and to the resulting solution there is added dropwise, at 40°, a solution of 15 g. of 1-bromo-4-nitrobenzene in 250 ml. of ethanol, whereafter the whole is refluxed for 12 hours. The reaction product is worked up analogously to Example 1(b) and there is obtained the pure thioether, 3-p-nitrophenylthio-5-acetyl-10,11-dihydro-5H-dibenz[b,f]azepine, M.P. 126° (from ethanol).

(b) 8.0 g. of this thioether are dissolved in 100 ml. of glacial acetic acid and the solution is heated to 90–95° To this well stirred solution 15 ml. of water are added and then 10 g. of iron filings are introduced in small portions. Then another 15 ml. of water are added, stirring is continued for 1 hour at 90–95°, 500 ml. of water are added and the mixture is extracted with diethyl ether. The ether phase is washed successively with water, saturated aqueous sodium carbonate solution and again with water, dried over sodium sulfate and evaporated to dryness.

The residue is dissolved in 200 ml. of water and 30 ml. of concentrated hydrochloric acid, 1.4 g. of sodium nitrite are added at 0° and the whole is stirred for half an hour at 0–5°. Then 30 ml. of cold hypophosphorous acid are added and the reaction mixture is left to stand first for 12 hours at 0° and then for 12 hours at 20° whereupon it is extracted with diethyl ether. The ether phase is in turn extracted with 2 N hydrochloric acid, washed neutral first with saturated aqueous sodium bicarbonate solution and then with water, dried over sodium sulfate and concentrated. The residue is crystallized from diethyl ether/petroleum ether and 3-phenylthio-5-acetyl-10,11-dihydro-5H-dibenz[b,f]azepine is obtained (M.P. 110–111°).

EXAMPLE 24

25.2 g. of 3-amino-5-acetyl-10,11-dihydro-5H-dibenz[b,f]azepine are dissolved in 25 ml. of concentrated hydrochloric acid and 230 ml. of water. The solution is cooled in an ice bath to 0° and 7 g. of sodium nitrite in 20 ml. of water are added in small portions. The diazonium salt solution is added dropwise to a strring flask in which 12 g. of thiophenol in 200 ml. of 20% sodium hydroxide solution have been kept at 73–75°. In order to prevent too high a concentration of the intermediate diazo sulfide from occurring the rate of addition is adjusted according to the amount of nitrogen developed which is quantitatively recorded during the reaction. On completion of the dropwise addition of the diazonium salt solution, the reaction mixture is heated for 30 minutes at 90°, cooled to 20° and then extracted with chloroform. The chloroform phase is well washed with aqueous 2 N sodium hydroxide solution, aqueous 2 N hydrochloric acid and water, dried over sodium sulfate and evaporated to dryness in vacuo. The residue consists of 3-phenylthio-5-acetyl-10,11-dihydro-5H-dibenz[b,f]azepine and crystallizes from diethyl ether/petroleum ether, M.P. 112°.

EXAMPLE 25

(a) 8.5 g. of 3-phenylthio - 5 - acetyl-10,11-dihydro-5H-dibenz[b,f]azepine, 7 g. of potassium hydroxide and 100 ml. of diethylene glycol monoethyl ether are refluxed for 12 hours. The reaction mixture is worked up analogously to Example 1(c) whereupon 3-phenylthio-10,11-dihydro - 5H - dibenz[b,f]azepine is obtained, M.P. 101° (from diethyl ether/petroleum ether).

(b) 5-(3'-dimethylamino-propyl) - 3 - phenylthio-10,11-dihydro-5H-dibenz[b,f]azepine, M.P. 85° (from diethyl ether/petroleum ether), is produced from the reaction product of step (a) and 3-dimethylamino-propyl chloride by following the procedure of Example 2.

EXAMPLE 26

(a) 10 g. of 3-amino-5-acetyl-5H-dibenz[b,f]azepine are dissolved in 20 ml. of concentrated hydrochloric acid and 80 ml. of water, and the solution is cooled in an ice bath to 0°. 2.8 g. of sodium nitrite dissolved in 10 ml. of water are added in small portions to the ice cooled reaction solution over a period of 40 minutes. The diazonium salt solution is then added to 300 ml. of glacial acetic acid to which 1.2 g. of copper-(II) chloride has been added and which has been saturated with sulfur dioxide. Sulfur dioxide is then introduced for 2 hours. The reaction mixture is poured into 1.5 liters of ice water whereupon 3-chlorosulfonyl compound crystallizes. It is filtered off, dissolved in benzene and washed with sodium bicarbonate and water. After distilling off the benzene, 3-chlorosulfonyl - 5 - acetyl-5H-dibenz[b,f]azepine remains as an amorphous mass.

(b) This chlorosulfonyl compound is reduced with hydroiodic acid as described in step (a) of Example 1. The amorphous bis-(5-acetyl - 5H - dibenz[b,f]azepin-3-yl) disulfide, without further purification, is converted with glucose, sodium hydroxide and methyl iodide into 3-methylthio-5-acetyl-5H-dibenz[b,f]azepine. 3-methylthio-5H-dibenz[b,f]azepine is produced therefrom with potassium hydroxide in diethylene glycol monoethyl ether. After recrystallization from acetone, it melts at 168°.

EXAMPLE 27

By repeating Example 26 but using in step (b) an equivalent amount of:

(a) Ethyl bromide in lieu of methyl iodide, there is obtained 3-ethylthio-5H-dibenz[b,f]azepine, M.P. 143° (from diethyl ether/petroleum ether);

(b) Isopropyl bromide in lieu of methyl iodide, there is obtained 3-isopropylthio-5H-dibenz[b,f]azepine.

EXAMPLE 28

(a) 10 g. of 3-methylthio-5-acetyl-10,11-dihydro-5H-dibenz[b,f]azepine are dissolved in 500 ml. of carbon tetrachloride and 7 g. of finely pulverized N-bromosuccinimide are added. The well-stirred suspension is irradiated for 2 hours with a 200 watt lamp. The succinimide is filtered off and the filtrate is evaporated in vacuo, affording 3-methylthio - 5 - acetyl-10-(or 11-)bromo-10,11-dihydro - 5H - dibenz[b,f]azepine which is refluxed for 8 hours with 16 g. of potassium hydroxide in 200 ml. of ethanol. The reaction mixture is evaporated, the residue is taken up in chloroform, the chloroform solution is washed with water, dried over sodium sulfate and evaporated in vacuo. The residue is dissolved in anhydrous benzene and the solution is filtered over a column containing 210 g. of alumina (Woelm, activity I), the column is washed with benzene and the filtrates are evaporated in vacuo. After recrystallization from acetone, 3-methylthio-5H-dibenz[b,f]azepine is obtained, M.P. 168°.

(b) 3-phenylthio-5H-dibenz[b,f]azepine is obtained in an analogous manner by using the process of Example 28(a) but using an equivalent of 3-phenylthio-5-acetyl-10,11-dihydro-dibenz[b,f]azepine in lieu of the 3-methylthio compound.

(c) By following the procedure of Example 2, there is obtained from 3-methylthio-5H-dibenz[b,f]azepine and 1-methyl-2-(2'-chloroethyl)-piperidine, 5-[2'-(1''-methyl-2''-piperidyl)-ethyl] - 3 - methylthio-5H-dibenz[b,f]azepine, B.P. 200°/0.001 torr.

EXAMPLE 29

By repeating Example 28(c), but using an equivalent amount of 3-dimethylamino-propyl chloride, in lieu of the piperidine, there is obtained 5-(3'-dimethylamino-propyl)-3-methylthio-5H-dibenz[b,f]azepine. This is converted with oxalic acid in diethyl ether into the oxalate which crystallizes from alcohol, M.P. 123°.

EXAMPLES 30 TO 34

In an analogous manner as described in Example 26 steps (a) and (b), and Example 28, step (c), and using the suitable reaction partners, there are obtained first the corresponding 3-substituted 5-acetyl-5H-dibenz[b,f]azepines and then the corresponding final products:

Example 30.—5-(3'-dimethylamino-propyl) - 3 - ethylthio-5H-dibenz[b,f]azepine;

Example 31.—5-(3' - dimethylamino-propyl)-3-phenylthio-5H-dibenz[b,f]azepine;

Example 32.—5-[2'-(1''-methyl-2''-piperidyl) - ethyl]-3-ethylthio-5H-dibenz[b,f]azepine;

Example 33.—5-(3'-dimethylamino - propyl)-3-isopropylthio-5H-dibenz[b,f]azepine;

Example 34.—5-(3'-dimethylamino-2'-methyl-propyl)-3-isopropylthio-5H-dibenz[b,f] azepine.

EXAMPLES 35 TO 38

By following the procedure of Example 19 there is obtained, in the intermediate carbamate:

Example 35.—From 5-(3'-dimethylamino-2'-methyl-propyl)-3-isopropylthio - 5H - dibenz[b,f]azepine: 5-(3'-methylamino - 2' - methyl-propyl) - 3 - isopropylthio-5H-dibenz[b,f]azepine;

Example 36.—From 5-(3'dimethylamino-propyl)-3-isopropylthio-5H-dibenz[b,f]azepine: 5-(3'-methylamino-propyl)-3-isopropylthio-5H-dibenz[b,f]azepine;

Example 37.—From 5-(3'-dimethylamino-propyl)-3-methylthio-5H-dibenz[b,f]azepine: 5 - (3'-methylamino-propyl)-3-methylthio-5H-dibenz[b,f]azepine;

Example 38.—From 5-(3'-dimethylamino-propyl)-3-ethylthio - 5H - dibenz[b,f]azepine: 5-(3'-methylamino-propyl)-3-ethylthio-5H-dibenz[b,f]azepine.

EXAMPLE 39

15 g. of 3-ethylthio-10,11-dihydro-5H-dibenz[b,f]azepine in 500 ml. of anhydrous benzene are placed in a flask fitted with a stirrer under a stream of nitrogen. While stirring, 2.3 g. of sodium amide finely suspended in 10 ml. of toluene are added and the reaction mixture is refluxed for 90 minutes. At 60° inner temperature, 9.5 g. of 1,3-chlorobromopropane in 20 ml. of anhydrous benzene are added dropwise within 10 minutes to the sodium salt formed. The mixture is then again refluxed for 5 hours. The reaction solution is washed with water. After distilling off the benzene, 5-(3'-chloropropyl)-3-ethylthio-10,11-dihydro-5H-dibenz[b,f]azepine remains. It is heated in an autoclave for 12 hours at 110° with 20 g. of dimethylamine and 30 ml. of methanol. The excess dimethylamine and the methanol are removed by distillation. The residue is taken up in ether and the basic part is extracted with 2 N hydrochloric acid. The aqueous hydrochloric acid extract is made alkaline with sodium hydroxide, the precipitated base is extracted with ether and the ethereal solution is washed with water and dried over sodium sulfate. After distilling off the ether, 5-(3'-dimethylamino-propyl)-3-ethylthio-10,11-dihydro-5H-dibenz[b,f]azepine remains which is converted with ethanolic oxalic acid to the oxalate, M.P. 179° (from ethanol).

EXAMPLE 40

1.9 g. of 5-(3'-methylamino-propyl)-3-methylthio-10,11-dihydro-5H-dibenz[b,f]azepine and 5 g. of acetic anhydride are heated in an oil bath for 1 hour at 100°. After cooling, water is added to the reaction solution and potassium bicarbonate is carefully added until the reaction is alkaline. The product is taken up in ether, the ethereal solution is extracted with 2 N hydrochloric acid and water, dried over sodium sulfate and evaporated to dryness in vacuo. The 5-(3'-acetyl-methylamino-propyl)-3-methylthio - 10,11 - dihydro-5H-dibenz[b,f]azepine which remains is taken up in 20 ml. of anhydrous diethyl ether and added dropwise within 5 minutes to the stirred suspension of 0.19 g. of lithium aluminum hydride in 30 ml. of anhydrous diethyl ether. On completion of the dropwise addition, the reaction mixture is refluxed for 3 hours. The excess lithium aluminum hydride is decomposed with water and the basic reaction product is extracted with 2 N hydrochloric acid. The aqueous solution is made alkaline with sodium hydroxide and extracted with ether. After evaporating the ether solution which has previously been dried over sodium sulfate, 5-(3'-methyl-ethylamino-propyl)-3-methylthio - 10,11 - dihydro-5H-dibenz[b,f]azepine remains which is converted into the oxalate with alcoholic oxalic acid. After recrystallization from ethanol/diethyl ether, the oxalate melts at 135°.

EXAMPLE 41

27 g. of 3-isopropylthio-10,11-dihydro-5H-dibenz[b,f]azepine are finely suspended in 200 ml. of anhydrous toluene. 40 g. of phosgene are introduced over a period of 60 minutes while stirring. The solution is then slowly heated and refluxed for 4 hours. After cooling, the excess phosgene is removed by aeration and the reaction solution is evaporated to dryness. The 3-iso-propylthio-10,11-dihydro - 5H - dibenz[b,f]azepine - 5 - carbonyl chloride formed and 100 ml. of benzene are placed in a flask fitted with a stirrer and 32 g. of pyridine and 47 g. of 3-dimethylamino-2-methyl-propanol are simultaneously added dropwise. The reaction mixture is refluxed for 4 hours, then 400 ml. of ether are added, the resulting mixture is thoroughly extracted with water and the organic phase is concentrated to dryness under reduced pressure. The residue is heated to 180° under water jet vacuum and the temperature is raised to 220° over a period of 3 hours. From the pyrolyzed product the basic portion is extracted with 2 N hydrochloric acid. The base is precipitated with sodium hydroxide, extracted with ether and converted to the hydrochloride with ethanolic hydrochloric acid. After recrystallization from acetone/ether, the 5-(3'-dimethylamino-2'-methyl - propyl)-3-isopropylthio-10,11-dihydro-5H-dibenz-[b,f]azepine melts at 156°.

We claim:
1. A compound of the formula

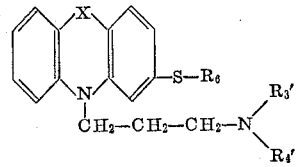

wherein X represents —CH$_2$—CH$_2$— or —CH=CH—, R$_3'$ represents hydrogen or alkyl of from 1 to 2 carbon atoms, R$_4'$ represents alkyl of from 1 to 2 carbon atoms, and R$_6$ represents ethyl or phenyl.

2. 5-(3'-dimethylaminopropyl) - 3 - ethylthio - 10,11-dihydro-5H-dibenz[b,f]azepine.

3. 5-(3'-dimethylamino-propyl) - 3 - phenylthio-10,11-dihydro-5H-dibenz[b,f]azepine.

References Cited

UNITED STATES PATENTS

| 3,038,896 | 6/1962 | Habicht et al. |
| 3,074,931 | 1/1963 | Craig. |
| 3,125,576 | 3/1964 | Biel. |
| 3,156,692 | 11/1964 | Muslin et al. |
| 3,324,113 | 6/1967 | Schindler et al. |

FOREIGN PATENTS 219,048   1/1962   Austria.

ALTON D. ROLLINS, *Primary Examiner.*

U.S. Cl. X.R.

204—158; 260—141, 268, 293, 293.4, 326.3, 326.8, 326.81; 424—244

PO-1050
(5/69)

UNITED STATES PATENT OFFICE
CERTIFICATE OF CORRECTION

Patent No. 3,446,798          Dated May 27, 1969

Inventor(s) Werner Kung and Daniel A. Prins

It is certified that error appears in the above-identified patent and that said Letters Patent are hereby corrected as shown below:

Col. 2, line 1; delete "and", first occurrence

Col. 4, line 22; "buffffer" should be — buffer —

Col. 9, line 71; should read "Example 2 from 3-methylthio 10-11-dihydro-5H-dibenz"

Col. 11, line 58; "methylamino" should be — methylpropyl —

Col. 11, line 67; "azepin" should be — azepine —

Col. 13, line 59; — amount — should be inserted after "equivalent" and before "of"

SIGNED AND
SEALED

MAR 3 1 1970

(SEAL)
Attest:

Edward M. Fletcher, Jr.
Attesting Officer

WILLIAM E. SCHUYLER, JR.
Commissioner of Patents